UNITED STATES PATENT OFFICE.

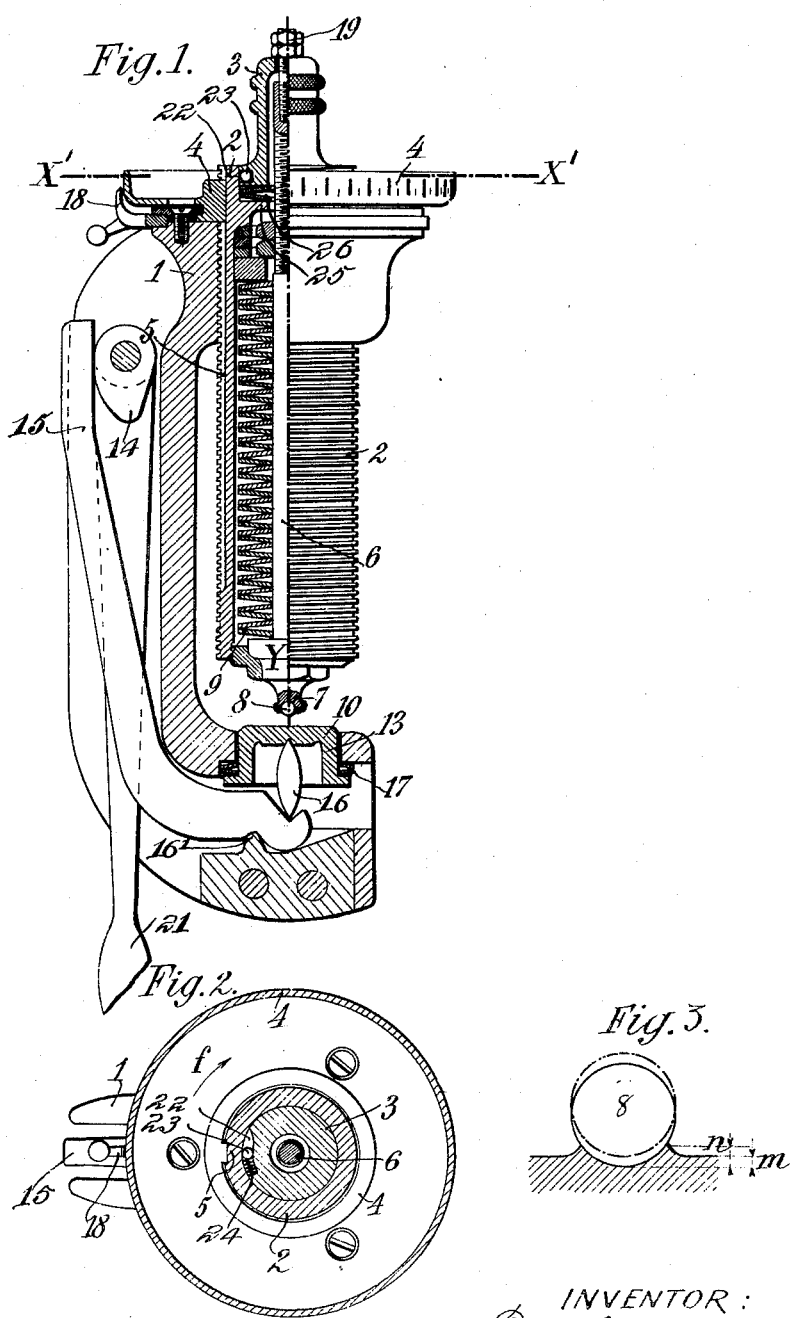

RENÉ GUILLERY, OF PARIS, FRANCE.

MACHINE FOR MEASURING DIRECTLY THE HARDNESS OF METALS.

1,091,128.  Specification of Letters Patent. Patented Mar. 24, 1914.

Application filed July 18, 1912. Serial No. 710,105.

*To all whom it may concern:*

Be it known that I, RENÉ GUILLERY, a citizen of the Republic of France, residing in Paris, France, have invented certain new and useful Improvements in Machines for Measuring Directly the Hardness of Metals, of which the following is a specification.

This invention relates to a machine designed to measure directly the hardness of metals. In this machine, which is based on the Brinell method, a ball is caused to penetrate into the metal which is to be tested and this ball is supported by an elastic cushion, adapted to work under a constant deviation for a given load. The cushion may be formed of one or several springs, or of washers of the kind known as Belleville washers. This combination of springs and ball is carried by a guide screw threaded externally, so that it can be lowered more or less by rotating it, and carrying at its upper part a graduated plate, the angular displacements of which relatively to a pointer allows of direct reading of the hardness of the test piece. This hardness is measured by the impression of the ball in the metal to be tested. This impression is measured by the distance $n$ (Fig. 3) which is greater than the true displacement $m$ of the ball, for the latter produces a projection of the metal in the form of an annular tip of the height $n-m$. The plate is graduated in such a manner that it shows directly the value of $m$ which is a function of the displacement $n$ of the ball. The deformation of the elastic cushion is produced by raising the support which carries the test piece, thus at the same time causing the ball to penetrate into the metal and deforming the elastic cushion; this lifting of the support is performed by means of a lever mechanism hereinafter described.

The accompanying drawings illustrate the invention.

Figure 1 is a vertical sectional view of the machine with parts shown in elevation. Fig. 2 is a cross section on line X'—X' of Fig. 1. Fig. 3 is an explanatory diagram drawn to an enlarged scale.

The machine comprises a frame 1, the upper part of which contains a female thread for the screw 2, the latter being terminated by a milled button 3. This screw can move vertically in an annular plate 4 graduated empirically on its periphery; as the screw turns it rotates the plate with it, there being a groove 5 in the screw parallel to its axis engaging a lug on the inner periphery of the plate. The screw 2 is hollow and contains a rod 6 suitably guided and terminating at its lower part in a cup 7 in which is lodged the ball 8 used for testing the hardness of the metal by the Brinell method. The rod 6 is subject to the vertical pressure of an elastic cushion adapted to be easily dismounted and preferably consisting of Belleville washers 9 situated within the screw 2 and tensioned to a determined degree. The adjustment of this cushion is made by means of the screw 19. At a lower part of the milled button 3 there is arranged a cavity 22 of curvilinear horizontal section as is seen in Fig. 2 and terminating in the form of a wedge. Into this cavity is placed a ball 23 forced into the wedge by a small spring 24. Finally between the lower face of the button 3 and an inwardly projecting flange 25 on the screw 2 there is arranged a spring 26 which forms a friction clutch. In this manner, when the milled button is turned in the direction of the arrow $f$ (Fig. 2), the screw 2 is entrained owing to the friction produced by the spring 26 between the flange 25 of the screw 2 and the lower face of the button 3, and the screw 2 thereupon descends. As soon as the ball 8 has come into contact with the test piece placed upon the supporting block 10 the screw 2 can no longer descend, and if the turning of the button is continued it will turn idly on the interior of the screw 2, the clutch allowing the parts to slip. When the milled button is turned in the direction opposite to the arrow $f$ (Fig. 2) the ball 23 will be wedged in the bottom of the cavity 22 and will cause the screw 2 and the button 3 to be joined together, so that the screw 2 will be turned with the button when the button is turned in a direction to cause the screw to rise. This arrangement allows, on the one hand, of the automatic stopping of the descent of the screw as soon as the ball 8 is in contact with the metal to be tested, and on the other hand the screw may be completely raised. The amount of flattening of the elastic cushion 9 corresponds to the load under which one wishes to make the test. The support 10 may be moved in the manner shown in Fig. 1, that is to say by a lever 21 operating through the intermediary of a cam 14, a lever 15 and a knife edged piece 16. The support 10 is returned to normal position after removal of the pressure by a spring or better a Belleville washer 17. The machine is completed by a pointer 18 which slides with slight friction in the frame and is for the purpose of indicating relatively to the graduations on the plate 4 the co-efficient of hardness of the test piece.

The machine operates in the following manner:—The lever 21 being in the vertical position (Fig. 1) the test piece is placed on the support 10. The button 3 is now turned to cause the micrometer screw 2 to descend until the ball 8 comes into contact with the test piece. As soon as this happens the button turns in the screw without moving it. The pointer 18 is then moved until it is opposite the initial or zero mark on the plate 4 and the lever 21 is operated to lift the support 10 and to cause the ball 8 to penetrate into the metal; the lever 21 is then returned to its vertical position. Under the action of the springs 9 the ball 8 retakes the position which it had before the test. The button 3 is now turned until the ball again comes into contact with the metal, this time entering the cavity previously formed: during this movement the screw 2 turns through an angle corresponding with the penetration of the ball. The operation is repeated a certain number of times up to the point when the ball 8 ceases to penetrate the metal. When the ball 8 is home in the cavity in the metal the pointer 18 shows a graduation on plate 4 corresponding with the hardness of the metal. In this manner the hardness of the metal is ascertained directly without having to measure the impression of the ball in the metal.

Having thus described my said invention and the best means I know of carrying the same into practical effect, I claim:—

1. In a machine for measuring directly the hardness of metals, comprising a ball, a support for the metal test piece, means for moving the metal test piece against said ball, a screw adapted to bring the ball into contact with the metal test piece, and an elastic cushion between said ball and screw.

2. A machine for measuring directly the hardness of metals, comprising a ball, an elastic cushion of known elasticity against which the ball rests, an externally screw threaded guide carrying the said cushion and ball and adapted to be lowered by rotating it, a graduated plate carried by the said guide and adapted to measure the degrees of rotation of said guide for indicating the longitudinal movement of said ball and means for applying pressure to the metal to be tested so as to force it against the said ball.

3. A machine for measuring directly the hardness of metals, comprising a ball, a screw-threaded support therefor movable toward and away from a sheet of metal to be tested, an elastic cushion between said ball and support, means for rotating said support to raise and lower the same comprising a finger piece or button, and a clutch between said button and threaded support, and means for pressing material to be tested against said ball.

4. A machine for measuring directly the hardness of metals, comprising a ball, a screw-threaded support therefor movable toward and away from a sheet of metal to be tested, an elastic cushion between said ball and support, means for rotating said support to raise and lower the same comprising a finger piece or button, and a clutch between said button and threaded support, adapted to permit relative motion between said button and said support when said ball on being moved toward the surface of the metal to be tested comes in contact therewith, and adapted to prevent relative movement of said parts when said button is turned in a direction to withdraw said ball from the surface of the metal to be tested.

5. A machine for measuring directly the hardness of metals, comprising a ball, a screw-threaded support therefor movable toward and away from a sheet of metal to be tested, an elastic cushion between said ball and support, means for rotating said support to raise and lower the same comprising a finger piece or button, said button having a groove with a wedging face therein, a roller adapted to clutch said button and support together when the button is turned in a direction to withdraw said ball from the surface of the metal to be tested, and a friction clutch between said support and button adapted to permit relative motion between said button and support when said ball on being moved toward the surface of a sheet of metal comes in contact therewith, and means for pressing material to be tested against said ball.

6. A machine for measuring directly the hardness of metals, comprising a ball, a screw-threaded support therefor movable toward and away from a sheet of metal to be tested, an elastic cushion between said ball and support, means for pressing material to be tested against said ball, and a scale for indicating the longitudinal movement of said ball.

7. A machine for measuring directly the hardness of metals, comprising a ball, a screw-threaded support therefor movable toward and away from a sheet of metal to be tested, an elastic cushion between said ball and support, means for pressing material to be tested against said ball, a scale carried by said ball support for indicating the longitudinal movement of said ball, and a pointer movable to different initial positions with respect to said scale.

8. A machine for measuring directly the hardness of metals, comprising a ball, an elastic cushion of known elasticity against which the ball rests, an externally screw threaded guide carrying the said cushion and ball and adapted to be lowered by rotating it, a graduated plate carried by the said guide, a support for the metal test piece, a lever, a cam operated by the said lever and a piece having knife edges interposed between the said cam and the said support so that when the lever is operated the support is raised to press the metal test piece against the said ball.

In witness whereof, I have hereunto signed my name in the presence of two subscribing witnesses.

RENÉ GUILLERY.

Witnesses:
  H. C. COXE,
  GABRIEL BELLIARD.